US009491154B2

(12) United States Patent
Bastian et al.

(10) Patent No.: US 9,491,154 B2
(45) Date of Patent: Nov. 8, 2016

(54) DOCUMENT, METHOD FOR AUTHENTICATING A USER, IN PARTICULAR FOR RELEASING A CHIP CARD FUNCTION, AND COMPUTER SYSTEM

(71) Applicant: BUNDESDRUCKEREI GMBH, Berlin (DE)

(72) Inventors: Paul Bastian, Berlin (DE); Frank Dietrich, Berlin (DE); Manfred Paeschke, Wandlitz (DE); Wolf Müller, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 174 days.

(21) Appl. No.: 14/355,271

(22) PCT Filed: Oct. 15, 2012

(86) PCT No.: PCT/EP2012/070368
§ 371 (c)(1),
(2) Date: Apr. 30, 2014

(87) PCT Pub. No.: WO2013/064359
PCT Pub. Date: May 10, 2013

(65) Prior Publication Data
US 2014/0289836 A1    Sep. 25, 2014

(30) Foreign Application Priority Data
Nov. 1, 2011 (DE) ........................ 10 2011 085 538

(51) Int. Cl.
*G06F 7/04* (2006.01)
*H04L 29/06* (2006.01)
*G06F 21/31* (2013.01)

(52) U.S. Cl.
CPC ............... *H04L 63/08* (2013.01); *G06F 21/31* (2013.01)

(58) Field of Classification Search
CPC ........ H04L 63/08; H04L 29/06; G06F 21/31
See application file for complete search history.

(56) References Cited

U.S. PATENT DOCUMENTS

| 5,246,375 A | * | 9/1993 | Goede | G07F 7/10 283/73 |
| 5,940,511 A | * | 8/1999 | Wilfong | G06Q 20/4012 705/72 |
| 6,776,332 B2 | * | 8/2004 | Allen | G06Q 20/108 235/379 |

(Continued)

FOREIGN PATENT DOCUMENTS

| DE | 195 09 517 | 10/1996 |
| DE | 10 2009 013 551 | 9/2010 |

(Continued)

OTHER PUBLICATIONS

Ing-diba: "Internetbanking +Brokerage", www.ing-diba.de/kundenservice/banking-und-brokerage/#!010901/04/2013.

*Primary Examiner* — Fatoumata Traore
*Assistant Examiner* — Khoi Le
(74) *Attorney, Agent, or Firm* — Leveque IP Law, P.C.

(57) ABSTRACT

A document having a non-volatile memory area for storing a secret identifier that has a first n-digit character sequence from a predefined character set; a random generator for selecting at least one character from the predefined character set for replacement of at least one character of the first character sequence, such that a second n-digit character sequence is defined as a result of this replacement; a volatile memory area for storing the at least one selected character; a display device for displaying the at least one selected character; an interface for inputting a third character sequence; and a processor element for authenticating the user to the document, wherein the processor element is configured to access the non-volatile memory area and the volatile memory area in order to read the second character sequence and check for a match between the second and third character sequences in order to authenticate the user.

18 Claims, 4 Drawing Sheets

(56) References Cited

U.S. PATENT DOCUMENTS

| | | |
|---|---|---|
| 2004/0068469 A1 | 4/2004 | Atig |
| 2005/0193208 A1* | 9/2005 | Charrette ............... G06F 21/31 713/182 |
| 2006/0031174 A1* | 2/2006 | Steinmetz ............... G06F 21/34 705/67 |

FOREIGN PATENT DOCUMENTS

| | | |
|---|---|---|
| DE | 10 2009 018 725 | 10/2010 |
| GB | 2379525 | 3/2003 |
| GB | 2431268 | 4/2007 |
| WO | WO99/08239 | 2/1999 |

* cited by examiner

US 9,491,154 B2

DOCUMENT, METHOD FOR AUTHENTICATING A USER, IN PARTICULAR FOR RELEASING A CHIP CARD FUNCTION, AND COMPUTER SYSTEM

PRIORITY CLAIM

This application claims benefit of foreign priority in accordance with 35 U.S.C. 119(b) to German application No. 10 2011 085 538.6 filed Nov. 1, 2011.

BACKGROUND

To release a chip card function, a prior authentication of the user to the chip card may be necessary, as is known per se from the prior art. For this purpose, the user may input authentication data into the chip card via a reader. This is performed for example by inputting a secret character sequence, which is generally referred to as a PIN (personal identification number).

For authentication, the PIN is input by the user via the keypad of a chip card terminal or of a computer, to which a chip card reader is connected, and is then sent to the chip card. This compares the input PIN with the stored PIN and then communicates the result to the terminal or the computer by outputting a corresponding signal.

BRIEF DESCRIPTION OF THE DRAWINGS

Embodiments of the disclosure will be explained in greater detail hereinafter with reference to the drawings, in which.

DESCRIPTION

Figure 1:
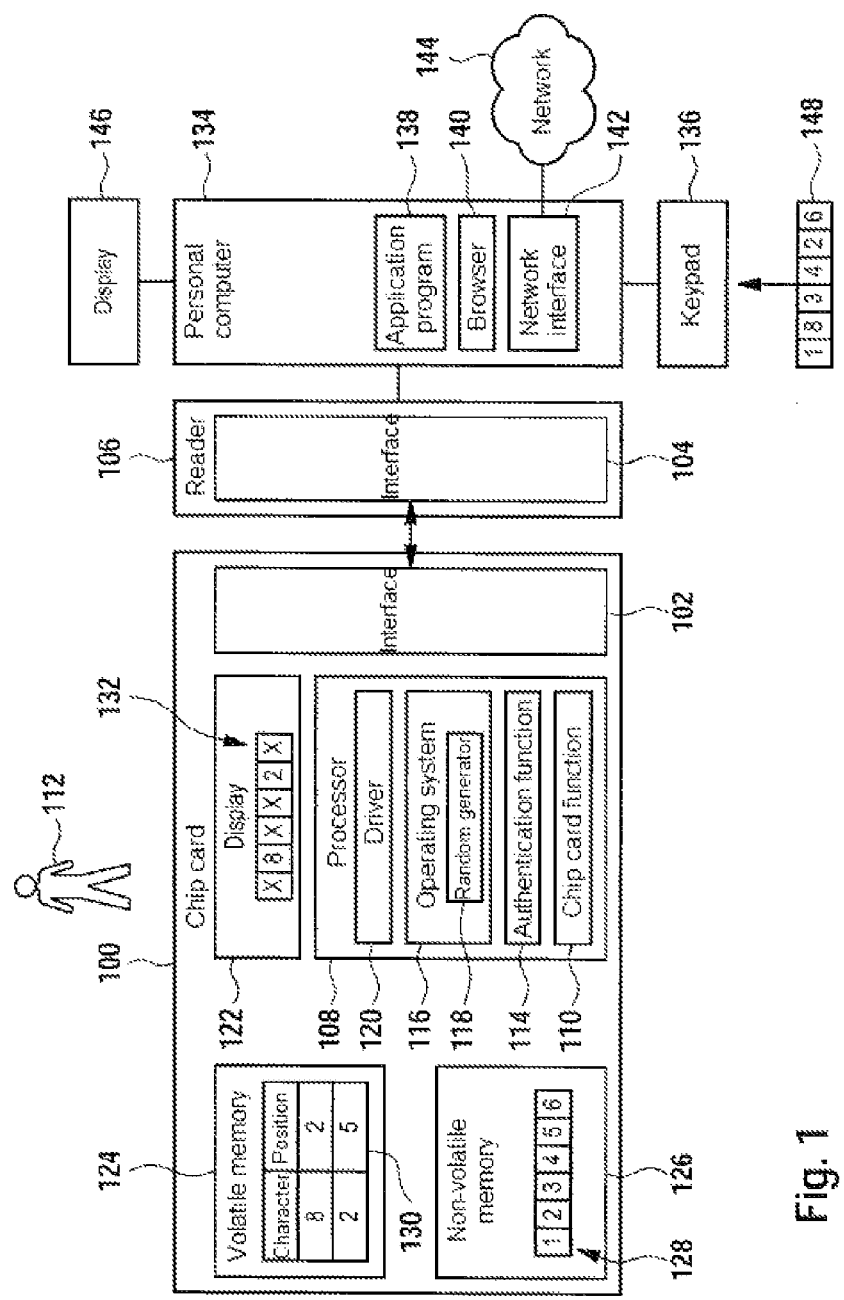
FIG. 1 shows a block diagram of an embodiment of a document according to the disclosure and of a computer system according to the disclosure.

By comparison, an object of the disclosure is to create an improved document, a method for authenticating a user to a document, and a computer system. Embodiments of the disclosure are specified in the dependent patent claims.

In accordance with embodiments of the disclosure, a document has a protected non-volatile memory area for storing a secret identifier, such as a PIN. The protected non-volatile memory area is preferably configured such that merely a processor of the document can access this protected memory area, wherein external write or read access to the protected memory area is ruled out in terms of circuitry.

The secret identifier is formed by an n-digit character sequence from a predefined character set. For example, it may be a PIN with a length between 4 and 12 numbers or alphanumerical characters, for example in accordance with ISO 9564-1. Depending on the embodiment, the predefined character set may be purely numerical, that is to say contains the numbers between 0 and 9, or may be an alphanumerical character set containing the numbers from 0-9 and also the uppercase and/or lowercase letters of the alphabet with or without special characters.

The document has a random generator or random generator means for selecting at least one character from the predefined character set. The at least one randomly selected character is used to replace one of the characters of the first character sequence so as to thus define a second n-digit character sequence. The position within the first character sequence of which the character is to be replaced by the randomly selected character can be predefined in a fixed manner or can be variable, in particular the position within the first character sequence of which the character is to be replaced by the randomly selected character can also be selected randomly, likewise with the aid of the random generator.

The randomly selected character or characters is/are stored in a volatile memory area of the document. The randomly selected characters are output via a display device of the document.

To authenticate himself, a user, at the predefined or randomly selected positions within the first character sequence, which is known to him, has to replace each of the relevant characters by the characters indicated on the display device. The third character sequence thus obtained is input by the user into the document via input means of the document, such as an interface. The document has processor element or means for authenticating the user to the document. To perform the authentication, the processor element accesses the non-volatile memory area and the volatile memory area so as to thus read the second character sequence. The second character sequence is then checked to ascertain whether it matches the third character sequence input by the user in order to authenticate the user.

Embodiments of the disclosure are particularly advantageous, since a keylogger attack can be thwarted without the need for a class II or class III chip card reader, for example in accordance with BSI TR-03119 Cat-B readers. Even if an attacker manages to intercept the third character sequence input by the user for example via a keypad of a computer, such an attacker thus cannot successfully use the intercepted character sequence for a subsequent fraudulent authentication to the document, since the second character sequence will have then already changed again for a subsequent authentication due to the random replacement of characters in the first character sequence.

In accordance with an embodiment of the disclosure the random generator is configured such that a number of m characters are selected from the predefined character set, wherein the difference from the number of positions n within the first character sequence and the number m of the selected characters is 4 for example, such that the second n-digit character sequence is defined by the replacement of a number of m characters of the first character sequence by the selected characters.

This has the advantage that at least four characters of the second character sequence are not displayed on the display device of the document, such that even if an attacker were to read the characters from the display device, for example, using a hidden camera, it is extremely unlikely that the attacker would guess the remaining four characters.

It is further of additional particular advantage that, even in the event of theft, the thief would not have the complete character sequence necessary for authentication, since only some, but not all, of the positions within this character sequence are displayed on the display device of the document. Without knowledge of the fixedly predefined static character sequence, that is to say the first character sequence, misuse is impossible in this case also.

In accordance with an embodiment of the disclosure, the random generator is configured to randomly select those positions within the first character sequence of which the characters are replaced by the randomly selected characters in order to define the second character sequence. Since not only the characters, but also the positions thereof in the first character sequence are random, the level of security is further increased.

In accordance with an embodiment of the disclosure, the display device is configured to signal to the user the positions within the first character sequence of which the characters are replaced by the randomly selected characters in order to define the second character sequence.

This can be performed such that the corresponding information is output in clear text for the user on the display device, for example in the form "replace the second digit of the PIN by 8 and replace the fifth digit of the PIN by 2" or by outputting another message of similar content. Alternatively, such a signalling can also be implemented acoustically.

In accordance with an embodiment of the disclosure, the randomly selected characters and the relevant positions, which likewise can be selected randomly, are displayed via displaying a fourth n-digit character sequence on the display device. Here, the fourth character sequence contains the randomly selected characters, which are specified at those positions within the fourth character sequence at which they are to replace the characters in the first character sequence. The remaining positions within the fourth character sequence are filled by a character or a symbol which is not from the character set from which the first character sequence is constructed. If the character set is a numerical character set, these characters may be letters, for example. If the character set is an alphanumerical character set, the characters used to fill the fourth character sequence may be, for example, a special character or symbol not belonging to the character set.

In accordance with an embodiment of the disclosure, the processor element is configured such that the selected characters are deleted from the volatile memory area following the authentication of the user. This can occur after each authentication or at the latest by each authentication request. In particular, the selected characters are deleted by being overwritten by characters selected for a subsequent authentication.

In accordance with an embodiment of the disclosure, the document has a wireless interface for communication with a reader and for coupling in energy. For example, the wireless interface comprises an antenna for coupling in an electromagnetic alternating field, for example in accordance with an RFID or NFC process. As soon as energy has been coupled into the document, the processor of the document automatically starts the execution of a program in order to perform the authentication of the user to the document. Once this authentication is complete, a chip card function of the document is released, for example.

In accordance with an embodiment of the disclosure, the document has a chip card operating system, which comprises a random generator. By means of the processor of the document, a program is executed, which performs the selection of the characters from the predefined character set with the aid of a random number supplied by the random generator.

In accordance with the disclosure, a "document" is understood in particular to mean paper-based and/or plastic-based documents, for example identification documents, in particular passports, personal identity cards, visas and driver's licenses, vehicle certificates, vehicle registration documents, company identification documents, health insurance cards or other ID documents and also chip cards, means of payment, in particular banknotes, bank cards and credit cards, consignment notes or other proofs of authority, into which a data memory and a processor and a display device are integrated.

The display device of the document can be an electrophoretic or electrochromic display, a bistable display, a rotary element display, in particular what is known as an electronic paper ("e-paper"), an LED display, in particular an inorganic, organic or hybrid LED display, an LCD display in various embodiments (for example twisted nematic, super twisted nematic, cholesteric, nematic), a ferroelectric display, an electrowetting display, an interferrometric modulator display (IMOD), a hybrid display, a display or a display means comprising a flexible display.

In a further aspect, the disclosure relates to a method for authenticating a user to a document comprising the following:

randomly selecting at least one character from the predefined character set for replacement of at least one character within the first character sequence at least at one $i^{th}$ position within the first character sequence, such that the second character sequence is thus defined, wherein the number A of positions within the first character sequence at which characters are replaced must be smaller than n, that is to say fewer than all characters of the first character sequence must be replaced. In other words, the following is true for the number A: $0<A<n$.

displaying the at least one randomly selected character on the display device, receiving the third character sequence, checking whether the third character sequence matches the second character sequence, and, if so, generating an authentication signal for signalling a successful authentication of the user.

In a further aspect, the disclosure relates to a computer system comprising a computer, a document and a reader for the document, wherein an application program for interaction with the document is installed on the computer, wherein the application program is configured to output an authentication request to the user, and wherein the computer has an input device, via which the user can input the third character sequence into the computer for forwarding to the document via the reader.

In particular, it is advantageous here that effective protection against "keylogging" is provided, even if the computer is connected to a public computer network, for example the Internet.

Identical or corresponding elements of the following embodiments are denoted by like reference signs in each case.

FIG. 1 shows a document 100, which is configured here as a chip card, for example in a standardised chip card format. The document 100 has an interface 102, which is configured for communication with a corresponding interface 104 of a reader 106. The interfaces 102 and 104 can be configured as contact or contactless interfaces, in particular in accordance with an RFID or NFC process. In particular, the interfaces 102 and 104 are configured such that energy for the energy supply of the document 100 is coupled from the interface 104 into the interface 102 by an electromagnetic alternating field. This occurs particularly preferably with a frequency of the alternating field in the kilohertz or megahertz range, preferably 13.56 MHz in accordance with ISO 14443.

The reader 106 may be what is known as a class 1 chip card reader, that is to say a chip card reader without a keypad and without its own display.

The document 100 has at least one processor 108 for performing a chip card function 110. For example, the chip card function 110 may be a payment function for carrying out a financial transaction, a signature function for generating an electronic signature, an encryption or decryption function, a function for access control, or a function for making available the digital identity of the user of the chip card 100, as is required for example for the "AusweissApp". The AusweissApp is known per se from the prior art and is implemented specifically for the new electronic personal identity card for the Federal Republic of Germany, in this regard see also DE 10 2008 000 067, DE 10 2010 028 133.6-31 and BSI TR-03103-7.

A precondition for the use of the chip card function 110 is that said function has to be released beforehand, which requires an authentication of the user 112 to the document 100. For this purpose, the document 100 has a program module 114, which implements an authentication function for the authentication the user 112 to the document 100. The program module 114 releases the chip card function 110 on account of a successful authentication.

The document 100 further has an operating system 116, in particular a chip card operating system, and a random generator 118, which can be implemented as a pseudo random number generator as a function of the operating system 116. However, the random generator 118 can also be implemented in a circuit-based manner, for example see IEEE Spectrum, September 2011, "Behind Intel's New Random-Number Generator".

The processor 108 may be a driver 120 for a display device, that is to say may comprise a display 122 of the document 100. Alternatively, the driver 120 can be formed as a separate circuit component or as an integral part of the display 122.

The display 122 and the further components of the document 100 are preferably integrated in a document body of the document 100. By way of example, the document body of the document 100 may be multi-layered.

For example, the display 122 may be a bistable display, in particular what is known as an electronic paper, or may be another display device.

The document 100 has one or more electronic memories. In particular, the document 100 has a volatile memory area 124, which is a random access memory of the processor 108 by way of example. The document further has a non-volatile memory area 126, which is used to store a secret identifier 128 belonging to the user 112. The identifier 128 is an n-digit character sequence from a predefined character set, wherein n here, without loss of generality, is equal to 6 and the character set comprises the numbers between 0 and 9. In the exemplary embodiment considered here, the identifier 128 is "123456". The identifier 128 is also referred to as a PIN of the user 112.

The memory area 126 is preferably configured in a circuit-based manner, such that external access to the memory area 126 via the interface 102 is not possible in principle, but such an access can only be performed by the processor 108. This is preferably also true for the memory area 124. This is then the case in particular if the memory area 124 is a random access memory of the processor 108, which can be addressed only by the processor 108 itself, but not via the interface 102.

The memory area 124 is used to store a number of m characters, wherein m<n, and wherein the m characters are selected with the aid of the random generator 118. Further, the memory area 124 can also be used to store an assignment of one of the randomly selected characters to a position within the identifier 128, wherein the position assigned to a selected character identifies the position within the identifier 128 of which the character is to be replaced by the selected character in question. The randomly selected characters and the respective positions can be stored in the memory area 124 for example in an assignment table 130 or in another data format.

The display 122 is used to output the randomly selected characters for the user 112, such that the user can read the randomly selected characters from the display 122. The corresponding positions to which the selected characters are assigned are preferably also output on the display 122 in accordance with the assignment table 130. This is then necessary in particular if the positions and, depending on embodiment, also the number of positions can be varied randomly.

The selected characters and the assigned positions can be displayed in clear text on the display 122 or can be displayed by outputting a character sequence 132. The character sequence 132 has the same number n of positions as the identifier 128. At the positions specified in the assignment table 130, the character sequence 132 contains the selected character assigned to the position in question. This means, in the example considered here, that the character sequence 132 has the character 8 at its second position and the character 2 at its fifth position.

At all other positions, that is to say at the first, third, fourth and sixth position, the character sequence 132 by contrast has an X in each case, that is to say a character that is not contained in the predefined character set. Alternatively, instead of being occupied uniformly by an X, these positions can be occupied by different letters or special characters, which likewise can be selected randomly on the condition that the user 112, for example at the time of communication of the identifier 128, is also informed that the predefined character set here consists of the numbers from 0 to 9.

The reader 106 is connected to a computer 134 or is integrated therein. For example, the computer 134 may be a personal computer (PC), a tablet computer, a smartphone or another electronic device.

The computer 134 has an input device 136, for example a speech input device or a keypad. By way of example, an application program 138 is installed on the computer 134, for example the "AusweissApp" or another application program, which can operate the chip card function 110. Further, an Internet browser 140 can be installed on the computer 134 in order to access a public network 144, such as the Internet, via a network interface 142. Further, a display 146 is connected to the computer 134, or the computer 134 comprises such a display 146 as an integral part.

To use the document 100, the user 112 brings the document into the range of the reader 106, for example by introducing the document 100 into the reader 106, or, in the case of a contactless design, by resting the document on the reader 106. Energy is then coupled into the document 100 via the interface 104, such that an operating voltage is available for operation of the various components of the document 100.

If the application program 138 requires the chip card function 110, it thus sends a corresponding request via the reader 106 to the document 100, for example in the form of what is known as an APDU. To release the chip card function 110, the program module 114 is then first started so that the user 112 authenticates himself to the document 100. To this end, one or more characters of the identifier 128 are first replaced by randomly selected characters, wherein the positions and number thereof in the identifier 128 of which the characters are to be replaced by randomly selected characters can be predefined or likewise may be random. For the case that the positions and number thereof are predefined, these can also be communicated to the user 112, for example at the time of communication of the identifier 128, for example in what is known as a PIN brief. The positions and number thereof then do not have to be displayed on the display 122.

In the embodiment considered here, the number m of the positions at which the characters in the identifier 128 are to be replaced by randomly selected characters is predefined in a fixed manner for example, but not the positions themselves.

The program module 114 therefore first calls up the random generator 118 in order to randomly select two of the n positions within the identifier 128, which are the positions 2 and 5 here, for example. These randomly selected positions 2 and 5 are stored in the assignment table 130 by the program module 114. The program module 114 then calls up the random generator 118 again in order to select, for each of the previously randomly selected positions 2 and 5, a character from the predefined character set, which are the characters 8 and 2 respectively in the example considered here. These are stored by the program 114, likewise in the assignment table 130. Lastly, the program module 114 actuates the driver 120 in order to display the character sequence 132 on the display 122. The user 112 can read the randomly selected characters, here the characters 8 and 2, and the respective position thereof from this character sequence 132. The further characters, that is to say "X" here for example, are ignored by the user 112, since the user knows that these characters do not belong to the predefined character set.

The character sequence 148, which the user 112 can input into the computer 134 via the keypad 136, is defined by the replacement of m characters in the identifier 128 at the randomly selected positions, that is to say here the replacement of the character 2 at the second position within the identifier 128 by the character 8 and the replacement of the character 5 at the fifth position within the identifier 128 by the character 2, as indicated in the character sequence 132. This number sequence 148 is sent by the application program 138 via the reader 106 to the document 100 once the user has input the number sequence 148 via the keypad 136. The number sequence 148 is transmitted in this way via a protected connection, for example by encryption of the number sequence 148 to be transmitted, said encryption being performed with the aid of the number sequence 148 itself. The program module 114 then compares the received character sequence 148 with the character sequence produced by replacement of the characters in the identifier 128 in accordance with the assignment table 130. If these character sequences match, that is to say if the character sequence 148 has been correctly input, the user 112 is thus authenticated, and the program module 114 releases the chip card function 110, such that the application program 138 can then use the chip card function 110.

Here, it is particularly advantageous that the reader 106 may be a very cost-effective class 1 chip card reader, without this being associated with a safety compromise, in particular even if the computer 134 is connected to the public network 144.

Figure 2:
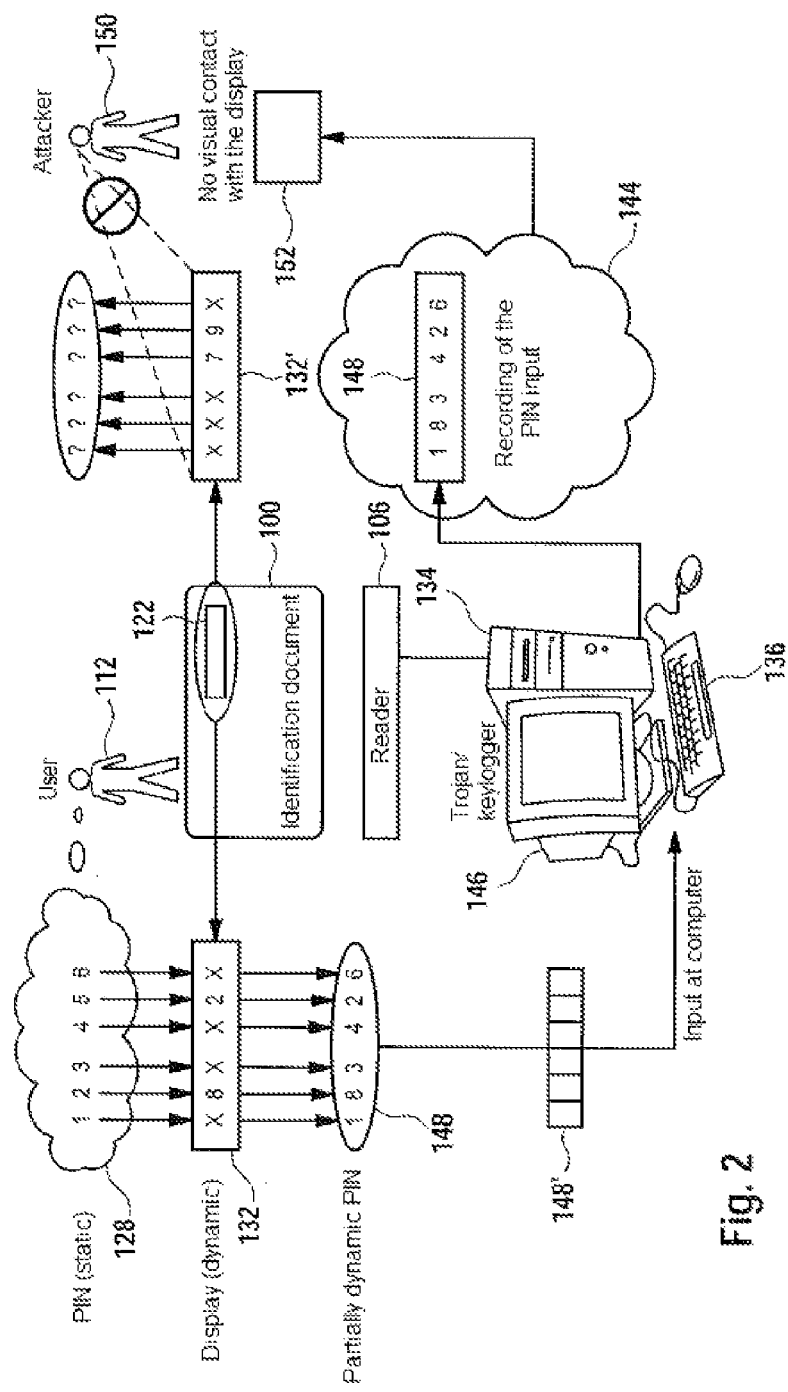
FIG. 2 shows a flow diagram for illustrating the defense against an attack.

FIG. 2 shows a corresponding attack scenario and defense thereagainst. For authentication of the user 112, the character sequence 132 is displayed on the display 122 of the document 100, for example an identification document. The user 112 then replaces the characters of his identifier 128 specified by the character sequence 132, such that he thus obtains the character sequence 148. The user then inputs a character sequence 148', which is to be identical to the character sequence 148, into the computer 134 via the keypad 136.

The computer 134 transmits the input character sequence 148' via the reader 106 to the document 100, preferably again via a protected connection. If the user 112 has correctly input the character sequence 148', this character sequence is thus identical to the character sequence 148 and the user is thus deemed to be authenticated. The program 114 (see FIG. 1) then deletes the assignment table 130 from the volatile memory 124.

For a subsequent further authentication of the user 112, the same approach is adopted, wherein other randomly selected characters are then specified by the character sequence 132, such that the character sequence 148 to be input by the user also changes accordingly.

An attacker 150 has installed via his computer 152 via the network 144, for example via the Internet, a malware, for example what is known as a keylogger, on the computer 134 of the user 112. The keylogger detects the inputs of the user 112 via the keypad 136, in particular a PIN input by the user 112 via the keypad 136, and transmits this via the network 144 to the computer 152 of the attacker 150.

If the attacker 150 attempts to use the character sequence 148 recorded with the aid of the keylogger for a subsequent further authentication in order to thus access the chip card function 110 without permission, this is therefore unsuccessful. For such a subsequent authentication, the character sequence 132 changes, for example into the character sequence 132', which specifies the random character 7 for the position 4 and the random character 9 for the position 5, such that the character sequence 123796 would then thus be input for a successful authentication. The authentication attempt of the attacker 150 with the aid of the character sequence 148 therefore has to fail. Since the attacker 150 cannot see the display 122, it is not possible for him to detect the correct character sequence for the further authentication, and therefore any attempted attack has to be futile.

For the case that a camera is connected to the computer 136, for example a webcam integrated in the display 146, the reader 106 is advantageously positioned such that the display 122 is not within the field of view of the webcam. An additional protection is thus provided against a situation in which the attacker 150 installs on the computer 134 a malware, for example, which activates the camera connected to the computer 134 and transmits the recorded images to his computer 152.

Figure 3:
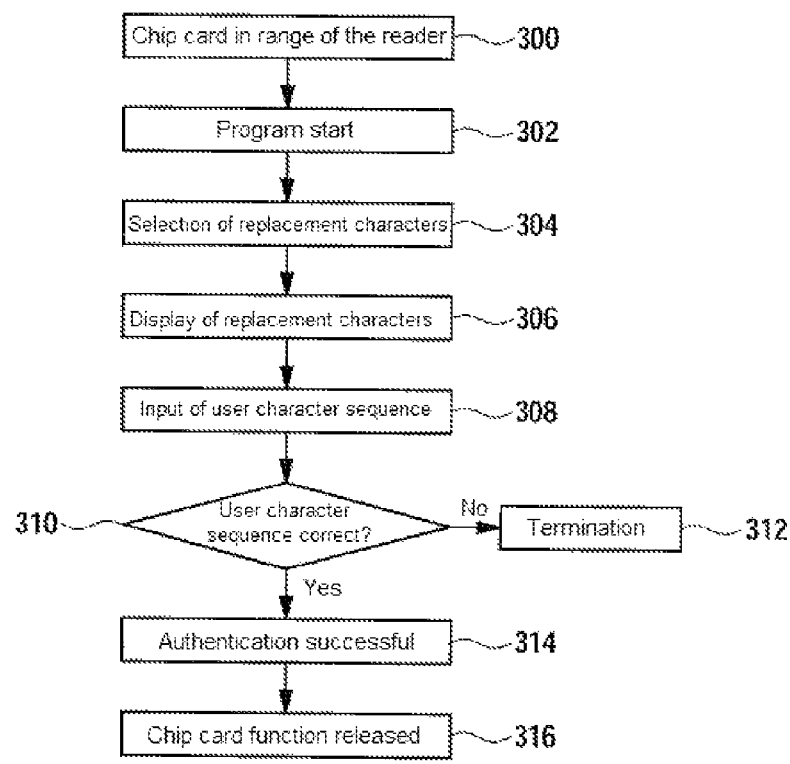
FIG. 3 shows a flow diagram of an embodiment of a method according to the disclosure.

FIG. 3 shows a corresponding flow diagram.

In the Block 300, the user brings his document into the range of the reader. Due to the coupling of energy into the document, the program module 114 (see FIG. 1) is started in Block 302. The program module 114 then selects, in Block 304 with the aid of the random generator, one or more characters from the predefined character set in order to thus replace the same number of characters at predefined or likewise randomly selected positions within the PIN known to the user, that is to say within the identifier 128. The replacement characters in question are displayed in Block 306 by the document as well as the positions in question, provided these are not predefined. In Block 308, the user inputs his identifier modified in this way, that is to say the character sequence 148' (see FIGS. 1 and 2). If the user has correctly input this character sequence 148', that is to say if this character sequence matches the character sequence 148, which is checked in Block 310 by the document, the user is thus deemed to have been successfully authenticated in Block 314, and therefore the chip card function of the document is released in Block 316. If, by contrast, the check in Block 310 reveals that the user has not correctly input the character sequence, the process is terminated in Block 312.

Figure 4:
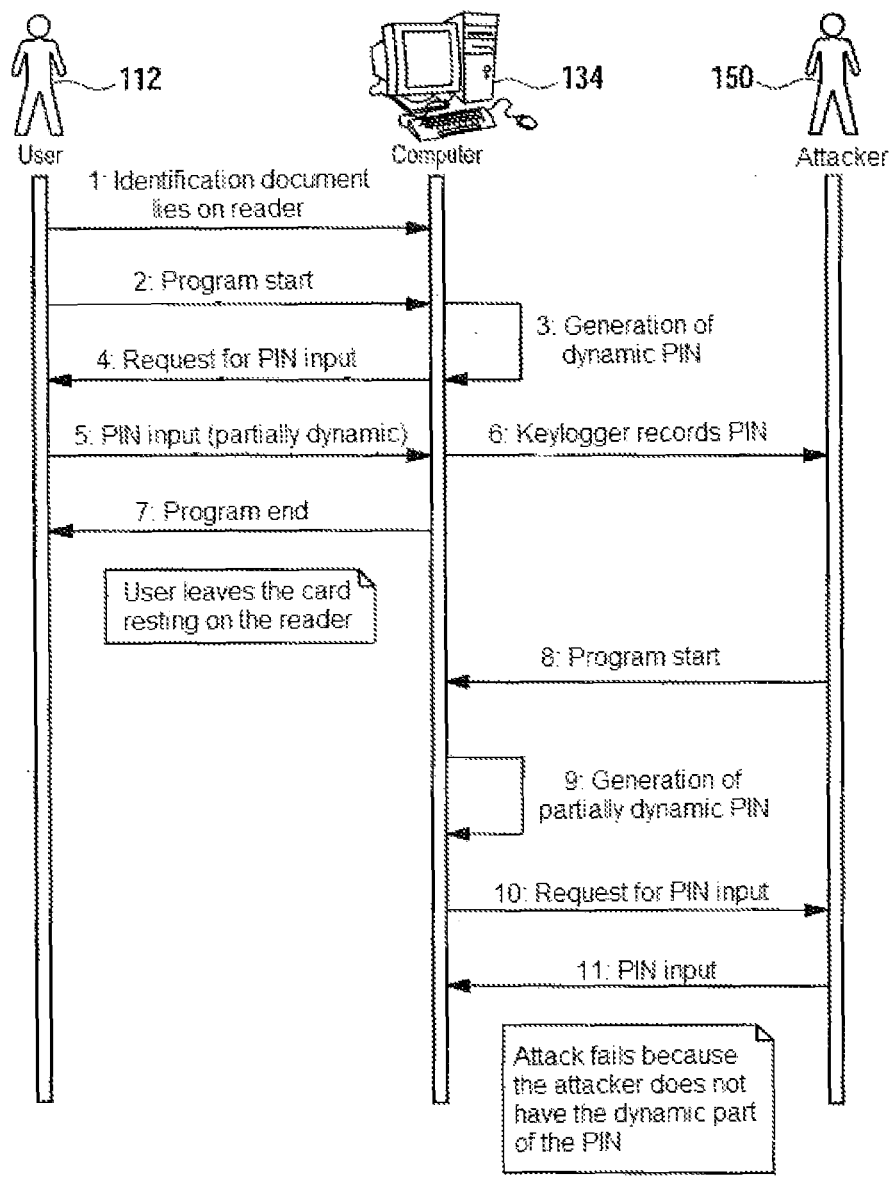
FIG. 4 shows a UML diagram of an embodiment of a method according to the disclosure.

FIG. 4 shows a corresponding flow diagram. In Block 1, the user 112 rests his document, that is to say for example his identification document, on the reader. Due to the coupling of energy into the document, the program module 114 (see FIG. 1) is then automatically started in Block 2. In Block 3, the document then generates the partially dynamic PIN, which has to be used for a subsequent authentication by the user 112, specifically by replacing one or more characters of the identifier 128 by random characters output via the display of the document. In Block 4, a request to input the PIN is then issued to the user 112, wherein the request is displayed for example via the display 122 or the display 146. In Block 5, the user 112 then inputs the partially dynamic PIN, that is to say the character sequence 148, into the computer 134, which the attacker 150 can detect in Block 6.

If the user 105 in Block 5 has input the partially dynamic PIN correctly, the chip card function is thus released, and therefore the application program of the computer 134 can access the chip card function. Once the application program has been terminated in Block 7, the user 112 leaves his document in the detection range of the reader, for example by leaving the document resting on the reader. Due to the energy coupled in furthermore, the program module 114 then starts again in Block 8, similarly to Block 2. In Block 3, a new partially dynamic PIN is then generated similarly in Block 9, and a request for PIN input is issued in Block 10 and is detected by the attacker 150 due to the malware previously installed by the attacker 150 on the computer 134. The attacker 150, in Block 11, then inputs the PIN detected in Block 6. The corresponding authentication attempt of the attacker 150 then has to fail because the PIN detected in Block 6 does not match the new partially dynamic PIN generated in Block 9.

Some aspects and features of the disclosed embodiments are set out in the following numbered items:

1. A document having a non-volatile memory area (126) for storing a secret identifier, wherein the identifier has a first n-digit character sequence (128) from a predefined character set, having random generator means (114, 118) for selecting at least one character from the predefined character set for replacement of at least one character of the first character sequence, such that a second n-digit character sequence (148) is defined as a result of this replacement, having a volatile memory area (124) for storing the at least one selected character, having a display device (122) for displaying the at least one selected character, having input means (102) for inputting a third character sequence (148'), having processor means (108, 114) for authenticating the user to the document, wherein the processor means is configured to access the non-volatile memory area and the volatile memory area in order to thus read the second character sequence (148) and to check for a match between the second (148) and third (148') character sequences in order to authenticate the user.

2. The document according to Claim 1, wherein the random generator means are configured such that a number of m characters from the predefined character set are selected, wherein the difference from the number of positions n within the first character sequence and the number m of selected characters is preferably 4, such that the second n-digit character sequence is defined by the replacement of a number of m characters of the first character sequence by the selected characters.

3. The document according to Claim 1 or 2, wherein the random generator means are configured to randomly select those positions within the first character sequence of which the characters are replaced by the randomly selected characters in order to define the second character sequence.

4. The document according to Claim 3, wherein the display device is configured to signal to the user the positions within the first character sequence of which the characters are replaced by the randomly selected characters in order to define the second character sequence.

5. The document according to one of the preceding claims, wherein the random generator means is configured to store an assignment of each of the selected characters to one of the positions within the first character sequence of which the character is to be replaced by the selected character.

6. The document according to Claim 5, wherein random generator means are configured to store in an assignment table (130) the assignments of each selected character to a position within the first character sequence.

7. The document according to one of the preceding claims, wherein the display device is configured to display a fourth n-digit character sequence (132, 132'), wherein the fourth character sequence contains the selected characters at those positions where the characters of the first character sequence are to be replaced by the selected characters, and at all other positions has a character or a symbol not included in the character set.

8. The document according to one of the preceding claims, wherein the processor means are configured such that the selected characters are deleted from the volatile memory area following the authentication of the user.

9. The document according to one of the preceding claims, having a wireless interface (102) for communication with a reader (106) and for coupling in electrical energy for the energy supply of the document, wherein the processor means comprise at least one processor (108) and a program (114), wherein the execution of the program is started by the processor automatically due to the coupling in of the energy, wherein the program is configured such that it directs a request to a random generator (118) on account of the program start in order to select characters from the predefined character set and in order to authenticate the user with the aid of the second character sequence thus defined.

10. The document according to Claim 9, wherein the document has an operating system (116) which comprises the random generator.

11. The document according to Claim 9 or 10, wherein the program is configured to select a character from the character set with the aid of a random number or pseudo random number output by the random generator.

12. The document according to one of the preceding claims, having a chip card function (110), which is configured for release on account of a successful authentication of the user.

13. The document according to one of the preceding claims, wherein the document is an identification document, in particular a passport, personal identity card, visa, driver's license, company identification document, health insurance card or other ID documents or a vehicle certificate, vehicle registration document or payment means, in particular banknote, bank card or credit card, consignment note or another proof of authority, wherein the document is configured in particular as a chip card.

14. A method for authenticating a user (112) to a document according to one of preceding Claims 1 to 13, comprising the following steps:
   randomly selecting at least one character from the predefined character set for replacement of at least one character, but fewer than all characters, of the first character sequence (128) at least at one $i^{th}$ position within the first character sequence, such that the second character sequence (148) is defined as a result,
   displaying the at least one randomly selected character on the display device, receiving the third character sequence (148'),
   checking whether the third character sequence matches the second character sequence, and, if so, generating an authentication signal for signalling a successful authentication of the user.

15. The method according to Claim 14, wherein the number and/or arrangement of the positions within the first character sequence of which the characters are to be replaced in each case by a randomly selected character are selected randomly, wherein the assignment of a randomly selected character to one of the positions within the first character sequence of which the character is replaced by the randomly selected character in question is stored in the volatile memory area.

16. The method according to Claim 15, wherein the assignments of the selected characters to the positions within the first character sequence and the selected characters are output on the display device.

17. A computer system having a computer (134), a document (100) according to one of Claims 1 to 13 and a reader (106) for the document, wherein an application program (138) for interaction with the document is installed on the computer, and wherein the computer has an input device (136), via which the user can input the third character sequence into the computer for forwarding to the document via the reader.

18. The computer system according to Claim 17, wherein the computer has a browser program (140) and a network interface (142) for connection to a public computer network (144).

LIST OF REFERENCE SIGNS 100 document
102 interface
104 interface
106 reader
108 processor
110 chip card function
112 user
114 program module
116 operating system
118 random generator
120 driver
122 display
124 memory area
126 memory area
128 identifier
130 assignment table
132 character sequence
132' character sequence
134 computer
136 input device
138 application program
140 browser
142 network interface
144 network
146 display
148 character sequence
148' character sequence
150 attacker
152 computer

What is claimed is:

1. An apparatus, embedded into a document, the apparatus comprising:
   a non-volatile memory area configured to store a secret identifier, wherein the secret identifier has a first n-digit character sequence from a predefined character set;
   a random generator configured to select at least one character from the predefined character set for replacement of at least one character of the first character sequence at least at one $i^{th}$ position within the first character sequence, such that a second n-digit character sequence is defined as a result of this replacement, with a number A of positions within the first character sequence at which characters are replaced being smaller than n, such that fewer than all of the characters of the first character sequence are replaced and a number n-A of positions within the first character sequence are not replaced;
   a volatile memory area configured to store the at least one selected character;
   a display device configured to display the at least one selected character;
   an interface configured to input a third character sequence to the document; and
   a processor element configured to authenticate a user to the document, wherein the processor element is configured to access the non-volatile memory area and the volatile memory area in order to thus read the second character sequence and to check for a match between the second and third character sequences in order to authenticate the user, and wherein the user is not authenticated if any of the characters in the n-A positions within third characters sequence do not match characters in the corresponding n-A positions within the second character sequence that were not replaced from the first character sequence.

2. The document apparatus according to claim 1, wherein the random generator is configured such that a number of m characters from the predefined character set are selected, wherein the difference from the number of positions n within the first character sequence and the number m of selected characters is 4, such that the second n-digit character sequence is defined by the replacement of a number of m characters of the first character sequence by the selected characters.

3. The apparatus according to claim 1, wherein the random generator is configured to randomly select those positions within the first character sequence of which the characters are replaced by the randomly selected characters in order to define the second character sequence.

4. The apparatus according to claim 3, wherein the display device is configured to signal to the user the positions within the first character sequence of which the characters are replaced by the randomly selected characters in order to define the second character sequence.

5. The apparatus according to claim 1, wherein the random generator is configured to store an assignment of each of the selected characters to one of the positions within the first character sequence of which the character is to be replaced by the selected character.

6. The apparatus according to claim 5, wherein the random generator is configured to store in an assignment table the assignments of each selected character to a position within the first character sequence.

7. The apparatus according to claim 1, wherein the display device is configured to display a fourth n-digit character sequence, wherein the fourth character sequence contains the selected characters at those positions where the characters of the first character sequence are to be replaced by the selected characters, and at all other positions has a character or a symbol not included in the character set.

8. The apparatus according to claim 1, wherein the processor element is configured such that the selected characters are deleted from the volatile memory area following the authentication of the user.

9. The apparatus according to claim 1, having a wireless interface for communication with a reader and for coupling in electrical energy for the energy supply of the apparatus, wherein the processor element comprises at least one processor and a program, wherein the execution of the program is started by the processor automatically due to the coupling in of the energy, wherein the program is configured such that it directs a request to a random generator on account of the program start in order to select characters from the predefined character set and in order to authenticate the user with the aid of the second character sequence thus defined.

10. The apparatus according to claim 9, wherein the apparatus has an operating system which comprises the random generator.

11. The apparatus according to claim 9, wherein the program is configured to select a character from the character set with the aid of a random number or pseudo random number output by the random generator.

12. The apparatus according to claim 1, having a chip card function, which is configured for release on account of a successful authentication of the user.

13. The apparatus according to claim 1, wherein the document is an identification document, in particular a passport, personal identity card, visa, driver's license, company identification document, health insurance card or other ID documents or a vehicle certificate, vehicle registration document or payment means, in particular banknote, bank card or credit card, consignment note or another proof of authority, wherein the document is configured in particular as a chip card.

14. A method for authenticating a user to a processor embedded into a document, comprising:
  storing a first n-digit character sequence from a predefined character in non-volatile memory embedded into the document;
  when the document is within range of a reader:
    randomly selecting, by the processor, at least one character from the predefined character set for replacement of at least one character of the first character sequence at least at one $i^{th}$ position within the first character sequence, such that a second n-digit character sequence is defined as a result of this replacement, with a number A of positions within the first character sequence at which characters are replaced being smaller than n, such that fewer than all of the characters of the first character sequence are replaced and a number n-A of positions within the first character sequence are not replaced;
    displaying the at least one randomly selected character on a display device embedded into the document;
    receiving, at an interface with the reader, a third character sequence; and
    checking, by the processor, whether the third character sequence matches the second character sequence, and, if so, generating an authentication signal that signals a successful authentication of the user and enabling execution, by the processor, of a chip-card function.

15. The method according to claim 14, wherein the number and/or arrangement of the positions within the first character sequence of which the characters are to be replaced in each case by a randomly selected character are selected randomly and wherein the assignment of a randomly selected character to one of the positions within the first character sequence of which the character is replaced by the randomly selected character is stored in a volatile memory area embedded into the document.

16. The method according to claim 15, wherein the assignments of the selected characters to the positions within the first character sequence and the selected characters are output on the display device embedded into the document.

17. A computer system, comprising:
  a computer;
  an apparatus embedded into a document, the document apparatus comprising:
    a non-volatile memory area configured to store a secret identifier, wherein the secret identifier has a first n-digit character sequence from a predefined character set;
    a random generator configured to select at least one character from the predefined character set for replacement of at least one character of the first character sequence at least at one $i^{th}$ position within the first character sequence, such that a second n-digit character sequence is defined as a result of this replacement, with a number A of positions within the first character sequence at which characters are replaced being smaller than n, such that fewer than all of the characters of the first character sequence are replaced and a number n-A of positions within the first character sequence are not replaced;
    a volatile memory area configured to store the at least one selected character;
    a display device configured to display the at least one selected character;
    an interface configured to input a third character sequence; and
    a processor element configured to authenticate the user to the apparatus embedded into the document, wherein the processor element is configured to access the non-volatile memory area and the volatile memory area in order to thus read the second character sequence and to check for a match between the second and third character sequences in order to authenticate the user; and
  a reader for the document, wherein an application program for interaction with the document is installed on the computer, and wherein the computer has an input device, via which the user can input the third character sequence into the computer for forwarding to the document via the reader.

18. The computer system according to claim 17, wherein the computer has a browser program and a network interface for connection to a public computer network.

* * * * *